(12) United States Patent
Wollenweber et al.

(10) Patent No.: US 7,129,497 B2
(45) Date of Patent: Oct. 31, 2006

(54) METHOD AND SYSTEM FOR NORMALIZATION OF A POSITRON EMISSION TOMOGRAPHY SYSTEM

(76) Inventors: Scott David Wollenweber, 2561 Fox River Cir., Waukesha, WI (US) 53189; Charles William Stearns, 15135 W. Lincoln Ave., New Berlin, WI (US) 53151; David Leo McDaniel, W316 Northey, Dousman, WI (US) 53118

( * ) Notice: Subject to any disclaimer, the term of this patent is extended or adjusted under 35 U.S.C. 154(b) by 270 days.

(21) Appl. No.: 10/843,503

(22) Filed: May 11, 2004

(65) Prior Publication Data

US 2005/0253076 A1   Nov. 17, 2005

(51) Int. Cl.
*G01T 1/164* (2006.01)

(52) U.S. Cl. .................................. 250/363.09

(58) Field of Classification Search .......... 250/363.09, 250/363.04
See application file for complete search history.

(56) References Cited

U.S. PATENT DOCUMENTS

| | | | |
|---|---|---|---|
| 6,980,683 B1 * | 12/2005 | Jones | 382/131 |
| 2004/0031925 A1 * | 2/2004 | Moyers et al. | 250/363.03 |
| 2004/0195512 A1 * | 10/2004 | Crosetto | 250/363.04 |
| 2005/0129170 A1 * | 6/2005 | Watson et al. | 378/5 |

OTHER PUBLICATIONS

S. D. Wollenweber C. W. Stearns, D. L. McDaniel; Dead-time Correction for a Rotating Rod Normalization Correction in a Cylindrical PET System;"IEEE Nuclear Science Symposium and Medical Imaging Conference 2003", paper code M16-149.

* cited by examiner

*Primary Examiner*—Otilia Gabor
(74) *Attorney, Agent, or Firm*—Small Patent Law Group; Dean D. Small (57) ABSTRACT

A method and system for normalization of a positron emission tomography system are provided. The method includes determining a plurality of block busy fractions for a positron emission tomography system and using the determined block busy fractions to provide correction during normalization of the positron emission tomography system.

34 Claims, 9 Drawing Sheets

METHOD AND SYSTEM FOR NORMALIZATION OF A POSITRON EMISSION TOMOGRAPHY SYSTEM

BACKGROUND OF THE INVENTION

This invention relates generally to normalization of positron emission tomography (PET) systems. More particularly, this invention relates to the determination of normalization factors utilized in image reconstruction.

Various techniques or modalities may be used for medical imaging of, for example, portions of a patient's body. PET imaging is a non-invasive nuclear imaging technique that makes possible the study of the internal organs of a human body. PET imaging allows the physician to view the patient's entire body, producing images of many functions of the human body.

In PET imaging, positron-emitting isotopes are injected into the patient's body. These isotopes are referred to as radiopharmaceuticals, which are short-lived unstable isotopes. Once injected into the body, these isotopes decay and discharge positively-charged particles called positrons. Upon discharge, when these positrons encounter an electron, they are annihilated and converted into a pair of photons. The two photons are emitted in nearly opposite directions. A PET scanner typically includes several coaxial rings of detectors around the patient's body to detect the paired photons from such annihilation events. These rings may be separated by short septa or detector shields.

The detectors include crystals or scintillators to sense the gamma rays colliding with them. Coincidence detection circuits connected to the detectors record only those photons that are detected simultaneously by two detectors on opposite sides of the patient. During a typical scan, millions of detected events are recorded to indicate the number of annihilation events along lines joining pairs of detectors in the ring. When a gamma ray emitted by a source interacts with a crystal in a detector, the crystal converts the gamma ray energy to lower energy scintillation photons that are then detected by a light sensor. The light sensor converts the scintillation photons to an electrical signal, which is processed by associated electronics to identify the crystal with which the gamma ray interacted, the time of interaction, and the number of photons generated by the gamma ray (i.e., the gamma ray energy). The collected data is then used to reconstruct an image.

The data collected during a scan, however, may contain inconsistencies. These inconsistencies may arise due to different factors or operating characteristics of the imaging systems, including the presence of shields or septa between the detector rings of the PET scanner, and the presence of attenuation, scatter and normalization effects. The collected data is therefore corrected prior to using such data for reconstruction of the radioisotope distribution image. One of the corrections uses a set of pre-determined normalization factors for correcting the acquired raw PET data. The normalization factors are unique to a given PET machine, and their values may change with time. Hence, the method followed for determination of the normalization factors, also referred to as the normalization process or normalization, is generally repeated periodically. For example, the normalization factors can be determined every six months.

One known method for performing the normalization process is the 'rotating rod normalization' process. In this process, a radioactive positron-emitting rod (line) source is rotated inside the ring of detectors. The responses for all system lines-of-response (LORs) are measured (LORs are the lines traced between the two crystals involved in detecting a coincidence event). Events measured in the LORs are then used to calculate the normalization factors. This normalization process is necessary to correct for detector pair efficiency and geometry differences such that all system LORs can be equalized in their response to a true coincidence event.

One known construction for a PET system is through use of 'block' detectors, these being multiple scintillator elements coupled to a common light-sensing component, commonly, a photomultiplier tube or PMT (e.g., a 6×6 element detector block). When a coincidence gamma ray strikes an element of the block detector, the entire block (multiple elements) is used in processing the event, because energy may be deposited in multiple scintillator elements. Therefore, the entire block is unavailable for processing further events for a period of time (e.g., dead-time).

The rotating rod normalization process is affected by the dead-time of the detectors. The dead-time of a detector is defined as the time taken by the detector to process a gamma ray striking the detector. Due to the dead-time, the system may not process all the gamma rays striking the detector. During the normalization scan, the fraction of time during which a detector is busy processing events is known as "block busy", and includes factors from block and associated electronics losses. In some scanners, the block busy fraction is measured directly by the scanner and reported for each scan. Essentially in these scanners, the block busy fraction may be inferred by the detector's output count rate. The higher the block busy reported for a detector, the higher the likelihood of a gamma ray being missed by the detector. The block busy of a detector depends on the distribution of radioactivity sources within and beyond the scanning field-of-view of that scanner. In the rotating rod normalization scan, block busy is highest when the source is closest to and centered over the detector. The block busy fraction for each detector in the system may be reported only once, or only a few times, during the course of a scan. In situations where the activity distribution is not stationary, such as the normalization scan with a rotating source, the reported block busy data represents the time-averaged block busy fraction through the reporting interval.

In a known PET scanner, the strength of the rod source was chosen such that losses in the gamma ray count due to the dead-time and, therefore, the block busy fraction, were small. In this scanner, the effects of dead-time in the normalization could be ignored. However, in other PET systems, rod sources with higher activity and less favorable source-detector geometry can be employed in order to decrease the time needed to acquire the normalization scan data. Furthermore, the length of the collimators between the source and the detectors may be reduced or totally eliminated. With increased rod source strength and the reduced length (or elimination) of collimators, losses due to dead-time during normalization cannot be ignored without causing artifacts or inaccuracies in the resultant normalization correction.

BRIEF DESCRIPTION OF THE INVENTION

In one embodiment, a method for normalization of a positron emission tomography system is provided. The method includes determining a plurality of block busy data during a normalization scan for a positron emission tomography system and using the determined block busy data to provide correction during normalization of the positron emission tomography system.

In another embodiment, a method for normalization of a positron emission tomography system is provided, with the normalization being performed by rotating a rod source within the positron emission tomography system. The positron emission tomography system includes at least one ring of block detectors and the method includes obtaining values of average block busy for each block detector and using the average block busy value to determine a model of count losses for any position of the rod source. The method further includes providing correction for losses due to dead-time in the positron emission tomography system, with the correction being provided by using measured values of block busy along with a parameterized model of the count losses.

In still another embodiment, a positron emission tomography system is provided. The positron emission tomography system includes a positron emission tomography scanner and a controller for controlling the operation of the positron emission tomography scanner. The controller is configured to correct for a dead-time period during a rotating rod normalization of the positron emission tomography scanner, with the dead-time correction based in part on a determined block busy time period corresponding to each of a plurality of positions within the positron emission tomography scanner.

DETAILED DESCRIPTION OF THE INVENTION

According to an embodiment of the invention, a method is provided for correcting for losses due to dead-time in a normalization process for a Positron Emission Tomography (PET) system. The PET system comprises a PET scanner and a controller. The PET scanner comprises at least one ring of detectors to detect gamma rays emitted from a source. A detector, also referred to as a block detector or a block, comprises a plurality of crystals (scintillators) to sense events. The controller controls the data acquisition, normalization and image reconstruction processes. The PET system is described in more detail in connection with FIG. 9 herein.

Figure 1:
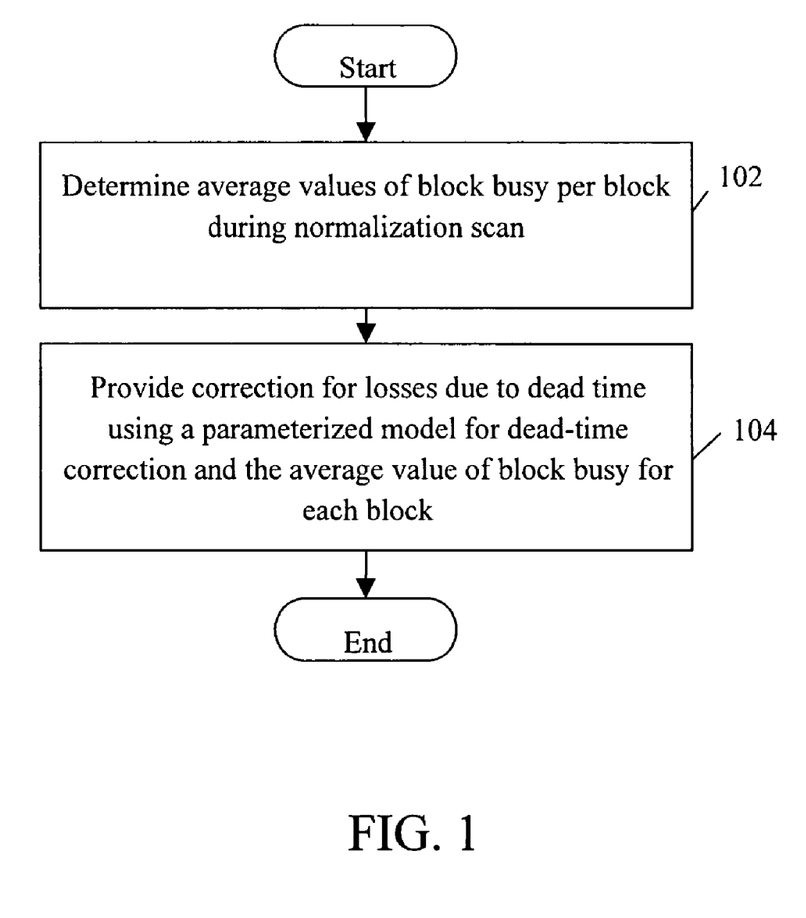
FIG. 1 is a flowchart illustrating a method for correcting losses due to dead-time in a normalization process for a PET system according to an exemplary embodiment of the invention.

FIG. 1 is a flowchart illustrating a method for correcting losses due to dead-time in a normalization process of a PET system according to an exemplary embodiment of the invention. The normalization process involves rotating a positron-emitting rod (line) source in a circular orbit within the PET scanner. At 102, an average value of block busy is measured per block for the entire normalization data collection scan. At 104, the losses due to dead-time are corrected using the measured average block busy and a parameterized method or model for dead-time correction. It should be noted that "block busy" as used herein refers to the fraction of time during a scan when a detector block is busy processing events. Block busy may include both a detector dead-time and other electronics and processing time components. Further, as used herein, "dead-time" of a detector refers to the time for a detector to process an event (e.g., photon hitting a crystal in a detector ring). During the dead-time, a detector cannot process another event (e.g., a new event).

Figure 2:
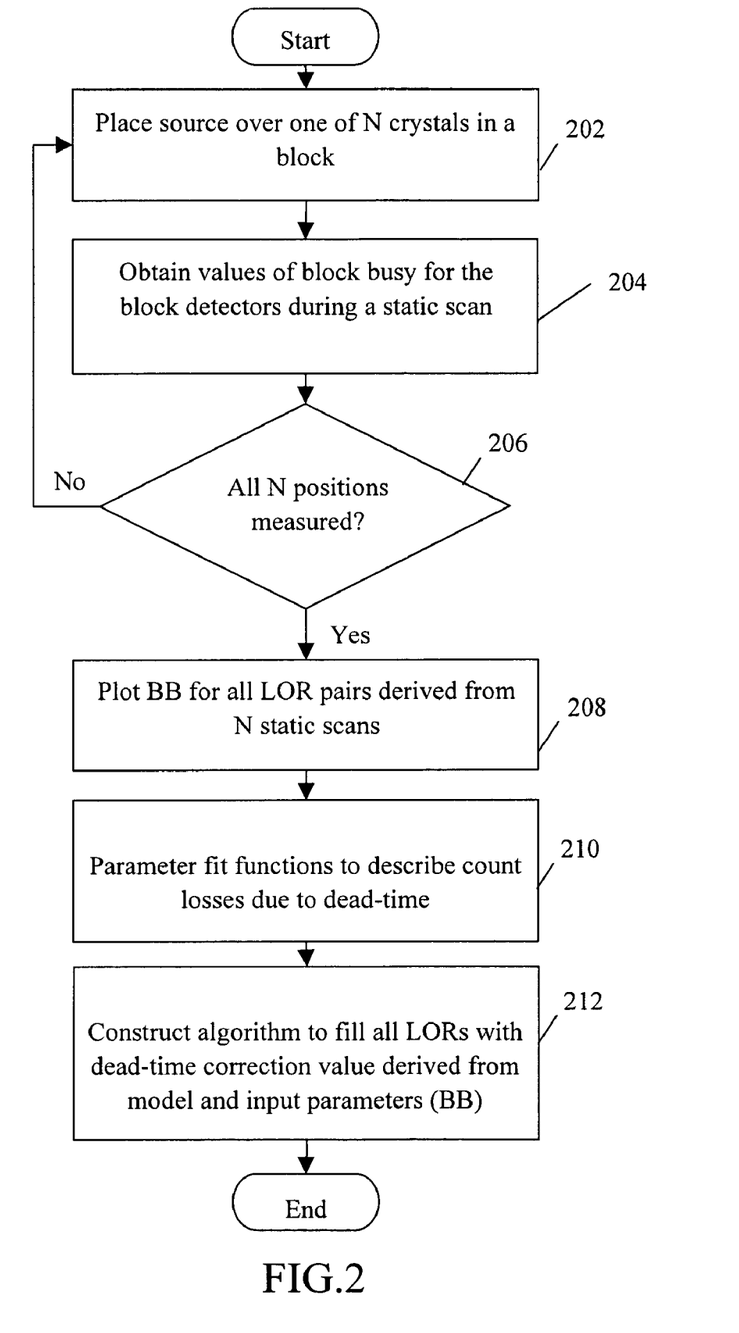
FIG. 2 is a flowchart illustrating a method for determining a parameterizable model allowing generation of a dead-time correction for a rotating-rod normalization process according to an exemplary embodiment of the invention.
Figure 4:
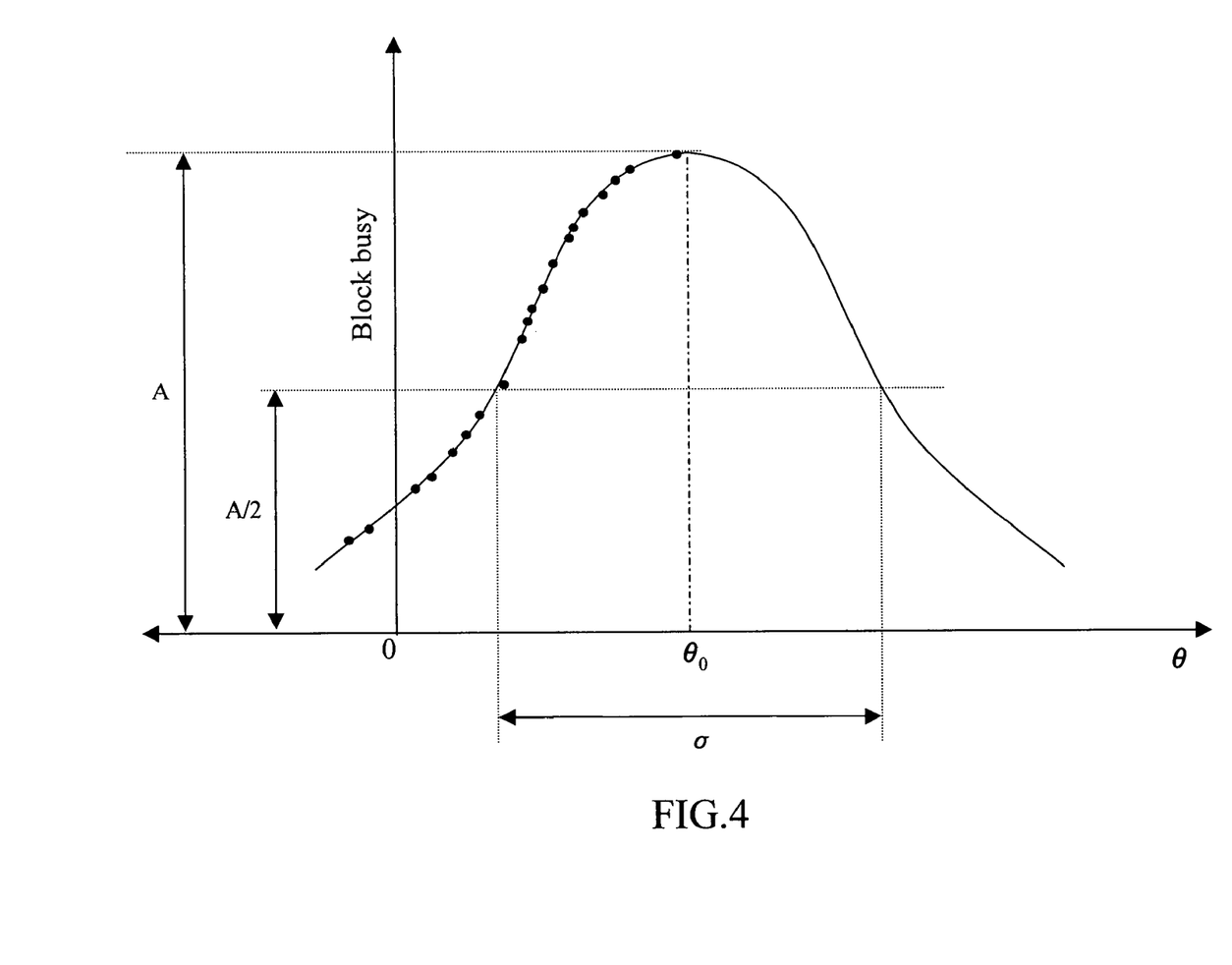
FIG. 4 is a Gaussian graph plotted according to measured readings of block busy for the static source locations.

FIG. 2 is a flowchart illustrating a method for determining a parameterized model allowing generation of a dead-time correction for a rotating-rod normalization process according to an exemplary embodiment of the invention. At 202, the source is positioned over one of the N crystals in a block. At 204, a block busy is determined for all blocks in the system. At 206, a determination is made as to whether a measurement has been made for source placement over each of N crystals in a block. If not, then the source is positioned over another crystal at 202. If a measurement has been made for each crystal, then at 208, a graph is plotted using the measurements of block busy obtained for a static source placed over each of N positions in the block detector. For example, a 6×6 block detector, this would require six static source measurements. For a M×N detector, it would require M measurements, assuming M is the tangential (around the ring) dimension of the block detector. The plotted graph may be generated as shown in FIG. 4. At 210, the determined function (Gaussian in one embodiment) is determined and parameterized. At 212, an algorithm is constructed that utilizes the measured input (block busy) and the model parameters (Gaussian fit) to generate the dead-time correction for the normalization scan data.

In addition to the direct measurement, Monte Carlo simulation may be used to estimate the count rates in discrete detector elements of a PET system. The Monte Carlo simulation may be used to emulate real data acquisition by computing simulated trajectories of photons emanating from the rod source and detected by the detector. The trajectories of photons are computed according to known probabilities of various interactions which the photons may undergo. Further, direct calculation methods may be used to provide estimates of the expected results of a real data acquisition by using models of the interactions of the photons with the rod source and the detector, as well as utilizing information regarding the electronics responses.

Figure 3:
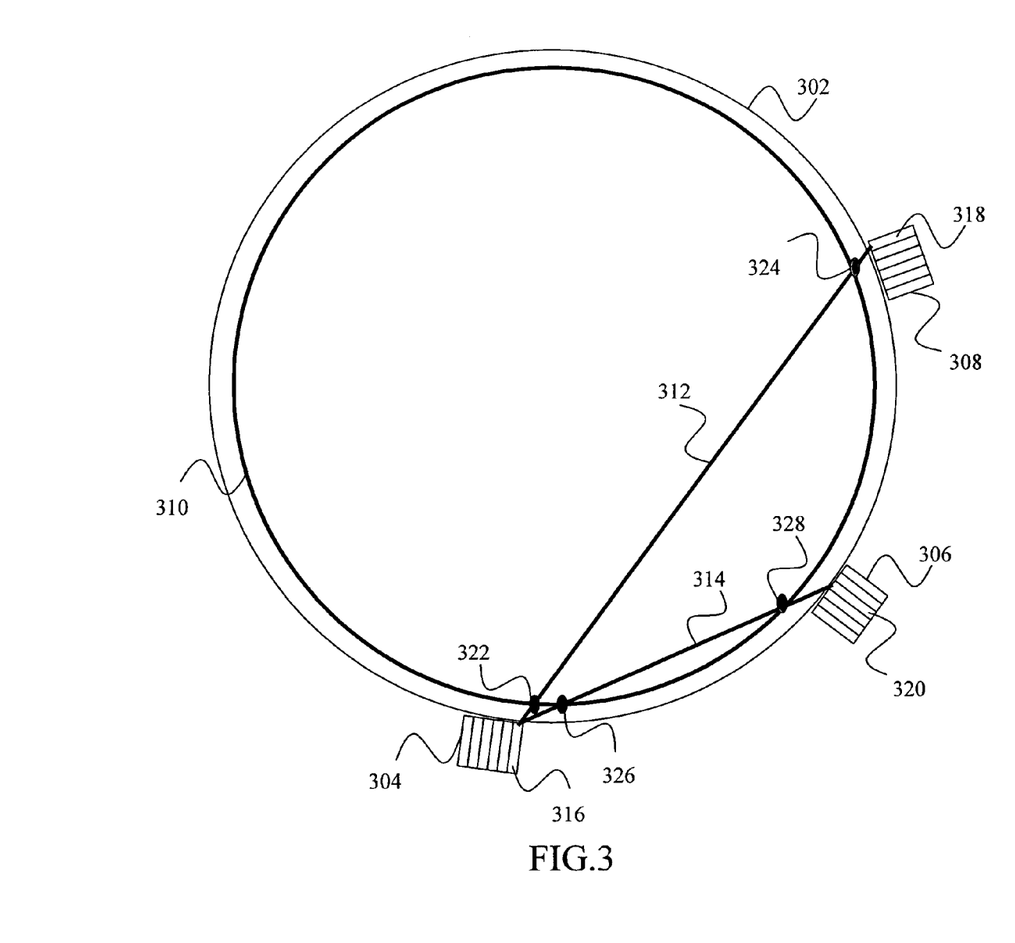
FIG. 3 is a schematic diagram of an exemplary PET scanner wherein a method for correction of losses due to dead-time in a normalization process may be performed according to exemplary embodiments of the invention.

FIG. 3 is a schematic diagram of a PET scanner in connection with which various embodiments of the invention for correcting losses due to dead-time in a rotating rod normalization process may be performed. All the blocks and the corresponding crystals in a detector ring are assumed to respond in a nearly identical fashion, and are uniformly placed around the detector ring. For explanatory purposes, only one detector ring 302 and three block detectors 304, 306 and 308 are shown in FIG. 3. Each block detector includes a plurality of crystals arranged in a two-dimensional array of, for example, six crystals in the circumferential direction around the detector ring and six crystals in the axial direction from the front to the back of the scanner. The detector ring 302 is configured having a circular orbit 310 on which a positron emitting rod source is rotated during the rotating rod normalization process. Two LORs, namely an LOR 312 and an LOR 314 are also shown. LOR 312 is between a crystal 316 and a crystal 318 and LOR 314 is between crystal 316 and a crystal 320. LOR 312 intersects circular orbit 310 at a location 322 and at a location 324. Thus, true coincidence event data acquired into LOR 312 corresponds to that from two locations of the rod source in circular orbit 310. Similarly, LOR 314 intersects circular orbit 310 at a location 326 and at a location 328.

In operation, the average block busy during a normalization scan is determined for each of the block detectors by rotating the rod source continuously at a constant velocity in circular orbit 310 and recording the average block busy for each detector block. In an exemplary embodiment, a dead-time model may be determined by measuring values of block busy with the rod source stationary over different positions in a block and for different strengths of the radioactive rod. As an example, consider the PET scanner shown in FIG. 3. The rod source is positioned at five different locations in front of the crystals in block 304 in circular orbit 310, and a corresponding block busy time is measured for each detector for each of the five locations. Using the cylindrical symmetry in the system, the measurement of block dead-time for the source located over other blocks near block 304 is determined by measuring the block busy in the adjacent blocks with the source in front of block 304. For example, if the source is over the equivalently positioned crystal 316 in the block adjacent to block 304, then the block busy measured in block 304 can be assumed to be that measured in the adjacent block with the source over crystal 316 in block 304. Applying this process iteratively, a curve is plotted based on the measurements of block busy for the N measurements. In an exemplary embodiment, the curve follows a Gaussian graph as shown in FIG. 4, parameterized by a width parameter $\sigma$, a magnitude parameter A and parameterized angle $\theta$. The parameters $\sigma$ and A are fit parameters obtained from the Gaussian fit to the measured block busy data. A is determined at the maximum of the curve (e.g., at theta equal to $\theta_0$), as shown in FIG. 4. The magnitude parameter A and width $\sigma$ obtained from the curve may differ according to different rod strengths and different geometries of the PET scanner. The width parameter $\sigma$ is determined from the curve according to Full Width Half Maximum (FWHM), which is the width at half the maximum height A of the curve. The form of the Gaussian function is:

$$f(\theta) = \frac{A}{\sigma\sqrt{2\pi}} \cdot e^{\left(\frac{-(\theta-\theta_0)^2}{2\sigma^2}\right)} \qquad (1)$$

Figure 5:
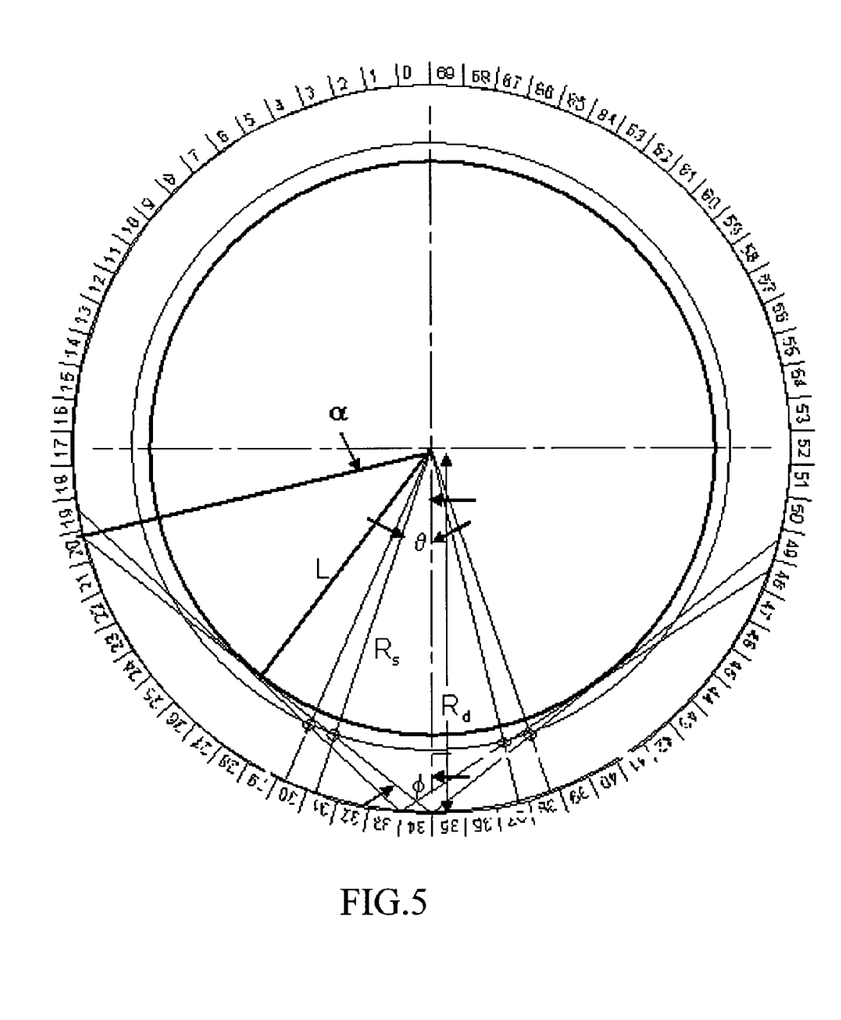
FIG. 5 is a schematic diagram of parameter set up of a PET scanner wherein a method to correct the losses due to dead-time in a normalization process may be performed according to exemplary embodiments of the present invention.

FIG. 5 is a schematic diagram of a parameter set up of a PET scanner wherein methods to correct losses due to dead-time in a rotating rod normalization process according to various embodiments of the invention may be performed. Four potential rotating rod source locations are shown, however, only one is used to demonstrate the angles used in the formulation. Three angles are shown that characterize the relative location of a crystal in a block: the location of the crystal from a defined 0 ($\theta$), the angle ($\alpha$) that determines the angle from 0 the line through the first crystal and the source, and angle ($\phi$) which completes the triangle with ($\theta$) and ($\alpha$). The line through the source to the two crystals defines the outermost possible line of response (LOR). All other LORs are defined using ($\theta$) and the equation relating the angles as follows:

$$\theta = \frac{\alpha}{2} - \arccos\left(\frac{R_d \sin\phi}{R_s}\right) \qquad (2)$$

where $R_s$ is the source rotation radius in centimeters (cm) and $R_d$ is the detector radius in cm (L is the imaging FOV radius in cm). With this equation, the Gaussian fit parameters as $f(\theta)$ from equation 1, and given a pair of detectors at the ends of a LOR, the block busy for any LOR can be calculated using the experimentally measured data.

The symmetry of the PET scanner can be used to reduce the data required to determine a dead-time correction model. The performance of detector blocks around the detector is assumed to be similar, thus, symmetry may be used to derive a model from fewer measurements. The model function, when parameterized in terms of the relative distance from the rod source to a block detector, is assumed to be parameterized the same for all block detectors in the ring, but dependent on the block busy for each block pair specifically. Some PET scanners have multiple detector rings in the axial direction. However, these PET scanners are typically axially and rotationally symmetric, such that the transfer function for a block at an axial location Z is the same as for a block with an axial location –Z with axial center determined at the center of the scanner. While the location of the source pin relative to a block can be parameterized in different ways (e.g., linear distance, angular distance along the circular orbit, etc), the angle of the LOR and the location of the crystals within the blocks are used in various embodiments.

From the N static source location measurements, block busy data for all LORs can be derived by assuming symmetry and similarity for blocks around the ring. From this, the Gaussian fit to the measured block busy from a static source is generated for the full LOR dataset. For example, for a GE Discovery™ ST PET scanner, there are (N=6) crystals per block in the circumferential direction and seventy blocks around a ring. As an example, the block busy for a point at the sixth position left from zero is determined using the static source over the $0^{th}$ crystal in block i and the block busy measured in block i+1.

It should be noted that the above process may be different for different major rings of detectors in a PET system due to the axial extent of the line source as viewed by detector blocks at different axial locations. For example, in a scanner with 6×6 blocks and four block detectors arranged axially, there are four axial major rings. Assuming symmetry about the center of the scanner, the process may be divided into two 'major' rings, the behavior or response of an inner ring, of which there are two in this example, and the behavior or response of an outer (end) major ring. The separation and symmetry uses a line source that covers only the axial extent of all four block detectors. The inner blocks, in the inner major rings, 'see' more effective line source length and hence are more affected by the source than the outer blocks and, therefore, potentially have an increased block busy or different block busy behavior. For each detector major ring type, the value of magnitude parameter A is assumed different. The value of the parameter σ for the PET system used in the example is the same for both major rings, but is not so limited, and may be different.

The block busy for any LOR corresponding to angle θ can be determined by determining the angle θ from equation 2 above, and then finding the correction by applying f(θ) in equation 1 with the appropriate set of A and σ.

With respect to correction of losses according to various embodiments of the invention, and referring to the PET scanner shown in FIG. 3, only those gamma rays that are within a set range of energies are accepted for further processing at the block detectors. A gamma ray that interacts with a crystal is not processed if (i) the electronics associated with its block is busy processing a previous gamma ray (dead-time loss), or (ii) another gamma ray interacts with the block while the first gamma ray is being processed, and the combined energies of the two gamma rays are outside an acceptable energy window (e.g., pileup loss). For example, the total number of gamma rays associated with LOR 312 is the sum of the counts acquired when the rod source is at position 322 and the counts acquired when the rod source is at position 324. For LOR 312, the counts corrected for losses due to electronic dead-time and pile up are defined by:

$$CTOTAL_{312\ corrected} = C_{312,\ 322\ corrected} + C_{312,\ 324\ corrected} \quad (3)$$

In the above equation, $C_{k,\ l\ corrected}$ is the number of coincidence gamma rays corrected along the LOR 'k' when the source is in position 'l'.

$C_{312,\ 322\ corrected}$ and $C_{312,\ 324\ corrected}$ can be calculated using the following equations:

$$C_{312,\ 322\ corrected} = C_{312,\ 322\ measured}/(1-P_{312,\ 322}) \quad (4)$$

$$C_{312,\ 324\ corrected} = C_{312,\ 324\ measured}/(1-P_{312,\ 324}) \quad (5)$$

In the equation given above, $C_{k,\ l\ measured}$ is the number of coincidence gamma rays measured along the LOR 'k' when the source is in position 'l'. $P_{k,\ l}$ is the probability that a coincidence pair along the LOR 'k' will not be counted due to count rate losses when the source is in position 'l'.

The following equations also apply to LOR 312:

$$(1-P_{312,\ 322}) = (1-S_{304,\ 322})(1-S_{318,\ 322}) \quad (6)$$

$$(1-P_{312,\ 324}) = (1-S_{304,\ 324})(1-S_{318,\ 324}) \quad (7)$$

In the above equations, $S_{n,\ l}$ is the probability that a gamma ray interacting in crystal 'n' will not be counted due to count rate losses when the source is in position 'l'.

Assuming that the losses in the gamma ray counts are only caused by pile up and dead-time, the following equation hold true:

$$(1-S_{n,l}) = (1-BD_{n,l})(1-PU_{n,l}) \quad (8)$$

In the equation given above, $BD_{n,\ l}$ is the probability that a gamma ray interacting in crystal 'n' will not be counted due to the detector electronics being busy processing another gamma ray when the source is in position 'l'. $PU_{n,\ l}$ is the probability that a gamma ray interacting in crystal 'n' will not be counted due to the pile up of another gamma ray in the detector when the source is in position 'l'. If there are additional count rate dependent losses due to other effects (e.g., if there are losses in the operation of the PET scanner multiplexer), the equation given above is modified to incorporate those losses.

The following equation can be used to determine the value of $BD_{n,l}$:

$$BD_{n,l} = \alpha BB_{m,l} \quad (9)$$

$BB_{m,\ l}$ is defined as the instantaneous block busy for block 'm' when the source is in position 'l'. In general, $BD_{n,\ l}$ is a function of $BB_{m,\ l}$. For example, in the case of the GE Discovery™ family of scanners, α is equal to 1.0 for the GE Discovery™-ST scanner.

Thus, and for example, for the GE Discovery™ ST family of scanners, the probability of losing an event due to pileup is modeled as a function of the block busy as follows:

$$PU_{n,l} = \beta_n BB_{m,l} \quad (10)$$

$\beta_n$ is a constant, the value of which depends on the location of the crystal in a block.

By combining equations 2 through 10 and reordering terms following equation for the total number of events measured along the line of response 312 is provided:

$$CTOTAL_{312\ measured} = C_{312,322\ corrected}(1-\alpha BB_{304,322})$$
$$(1-\beta_6 BB_{304,322})(1-\alpha BB_{308,322})(1-\beta_6 BB_{308,322}) +$$
$$C_{312,324\ corrected}(1-\alpha BB_{304,324})(1-\beta_5 BB_{304,\ 324})$$
$$(1-\beta BB_{308,\ 324}) \quad (11)$$

In various embodiments (e.g., in a well designed scanner), the corrected counts along the LOR will be almost equal when the source is in position 322 and position 324. Equation 11 then can be rewritten as follows:

$$CTOTAL_{312\ measured} = CTOTAL_{312\ corrected}[(1-\alpha BB_{304,322})(1-\beta_6 BB_{304,322})(1-\alpha BB_{308,322})(1-\beta_6 BB_{308,322}) + (1-\alpha BB_{304,324})(1-\beta_5 BB_{304,\ 324})(1-\beta_6 BB_{308,324})]/2 \quad (12)$$

Or, $$CTOTAL_{312\ corrected} = CTOTAL_{312\ measured}/\lambda_{312} \quad (13)$$

Where, $$\lambda_{312} = [(1-\alpha BB_{304,322})(1-\beta_6 BB_{304,322})(1-\alpha BB_{308,322})$$
$$(1-\beta_6 BB_{308,322}) + (1-\alpha BB_{304,324})(1-\beta_5 BB_{304,\ 324})$$
$$(1-\alpha BB_{308,\ 324})(1-\beta_6 BB_{308,\ 324})]/2 \quad (14)$$

$\lambda_{312}$ is the count rate dependent loss correction factor for counts along the LOR 312 for a rotating rod. Because $\lambda_{312}$ depends only on block busy, a model function between the average block busy and the crystal location in the block allows correction of the normalization data for count rate losses for all LORs to which the block contributes.

Equation 14 can be simplified by noting that for some scanners (e.g., whole body scanners), the count rate losses for blocks located a further distance from the source rod are very small and can be ignored. That is, $\alpha BB_{308,\ 322} \ll 1$
$\beta_6 BB_{308,\ 322} \ll 1$
$\alpha BB_{304,\ 324} \ll 1$
$\beta_6 BB_{304,\ 324} \ll 1$ Equation 14 then simplifies to the following:

$$\lambda_{312} = [(1-\alpha BB_{304,\ 322})(1-\beta_6 BB_{304,\ 322}) + (1-\alpha BB_{308,\ 324})(1-\beta_6 BB_{308,\ 324})]/2 \quad (15)$$

The constant α may be calculated based on the specifics or requirements of the design of the detector electronics. The constant $\beta_n$ may be determined by acquiring normalization data with different rod source activities and fitting the data to determine the $\beta_n$.

Figure 6:
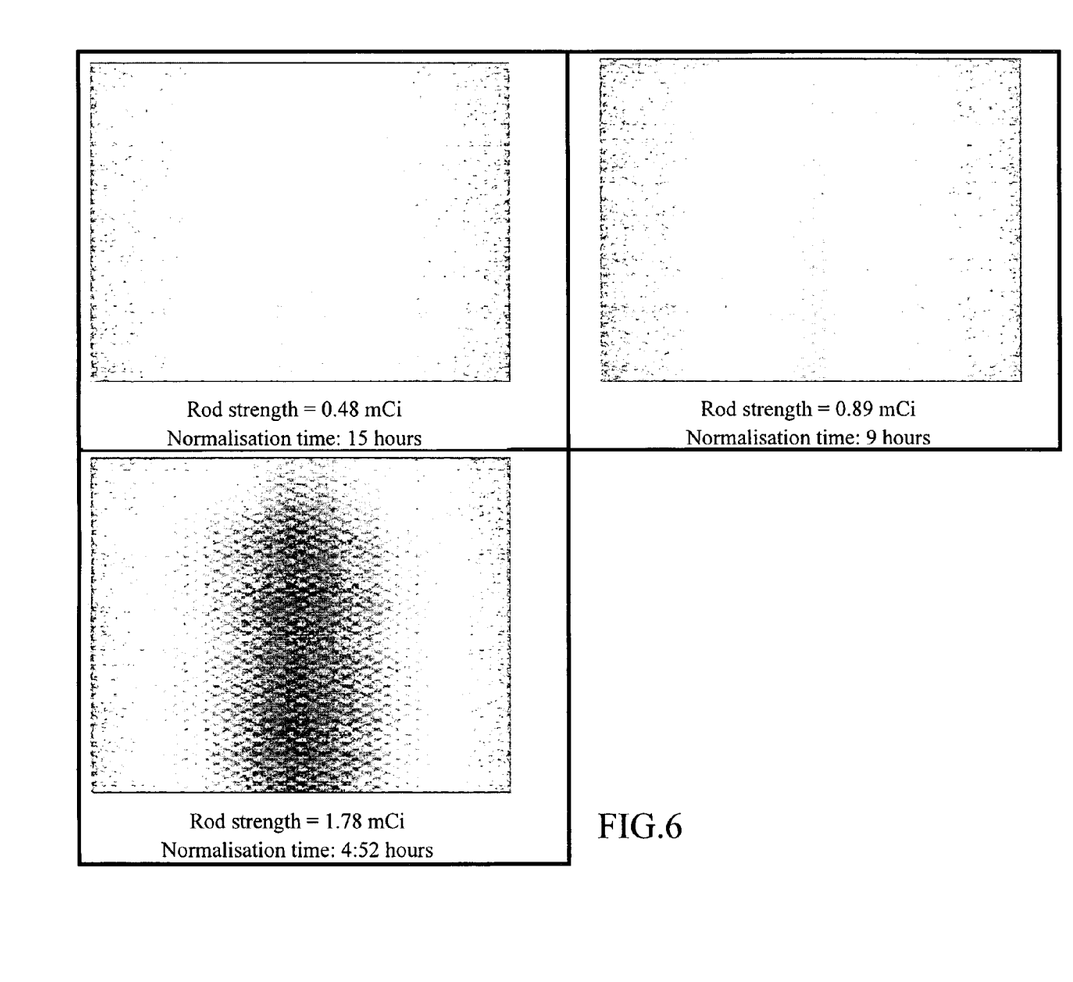
FIG. 6 are exemplary normalization sinograms utilizing three rod radioactivity levels according to an exemplary embodiment of the invention.

FIG. 6 illustrates normalization sinograms for three rod strengths according to an exemplary embodiment of the invention. The three normalization sinograms correspond to (i) the rod strength of 0.48 mCi, and time taken for normalization (also known as normalization time)=15 hours; (ii) the rod strength of 0.89 mCi, and time taken for normalization=9 hours; and (iii) the rod strength of 1.78 mCi, and time taken for normalization=4:52 hours. All three measurements achieved nearly equivalent count statistics, hence, the only additional effect was that of dead-time. The effect of dead-time is shown in FIG. 6, in which the two-component frequency (mod 6 and f(r)) of the correction component varies from center radially outward. The realization of the artifact is that the highest activity norm (1.78 mCi) has different behavior as a function of distance from the center of the image (sinogram) than at the lowest activity normalization.

Figure 7:
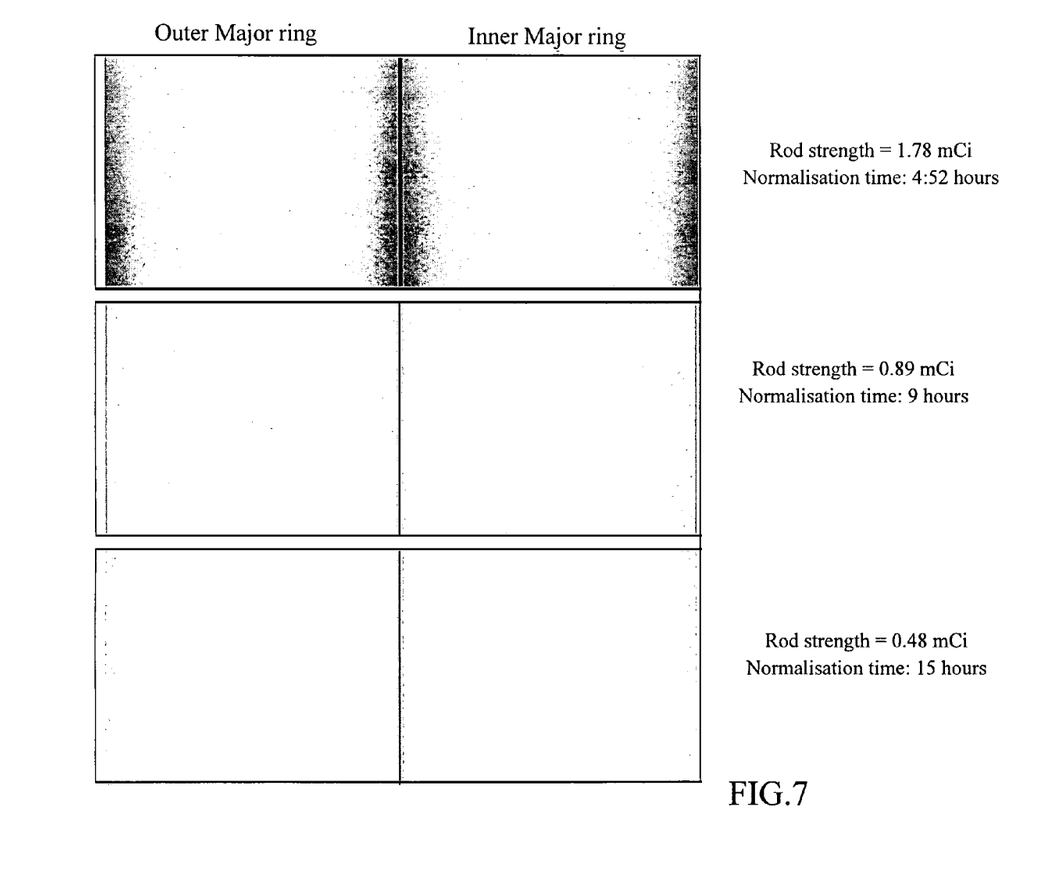
FIG. 7 are exemplary dead-time correction sinograms generated in accordance with the methods of various embodiments of the invention.

FIG. 7 illustrates exemplary normalization dead-time correction sinograms generated in accordance with the methods of the various embodiments of the invention. The three sets of normalization correction sinograms correspond to the three different rod strengths and normalization acquisition times. Each set illustrates a separate dead-time correction for inner and outer major rings. It should be noted that normalization dead-time correction sinograms are different for the different major rings. This is caused by the different model parameters determined in the different major rings.

Figure 8:
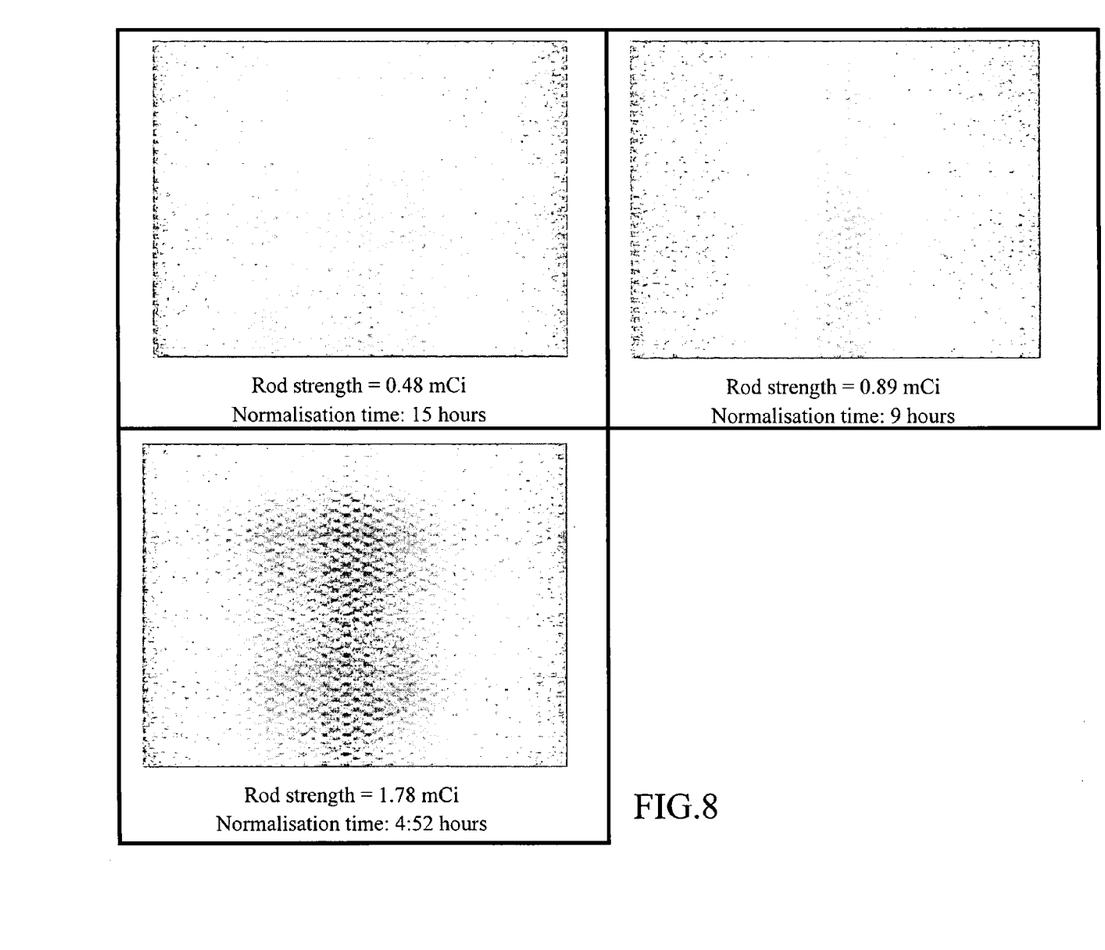
FIG. 8 are dead-time corrected normalization sinograms, corrected after applying the dead-time correction sinograms (shown in FIG. 8) to normalization sinograms (shown in FIG. 7)

FIG. 8 illustrates the dead-time corrected normalization sinograms, corrected after applying the dead-time correction sinograms (shown in FIG. 7) to normalization sinograms (shown in FIG. 6). As shown, the three corrected sinograms are more similar to each other than the uncorrected versions shown in FIG. 6.

Figure 9:
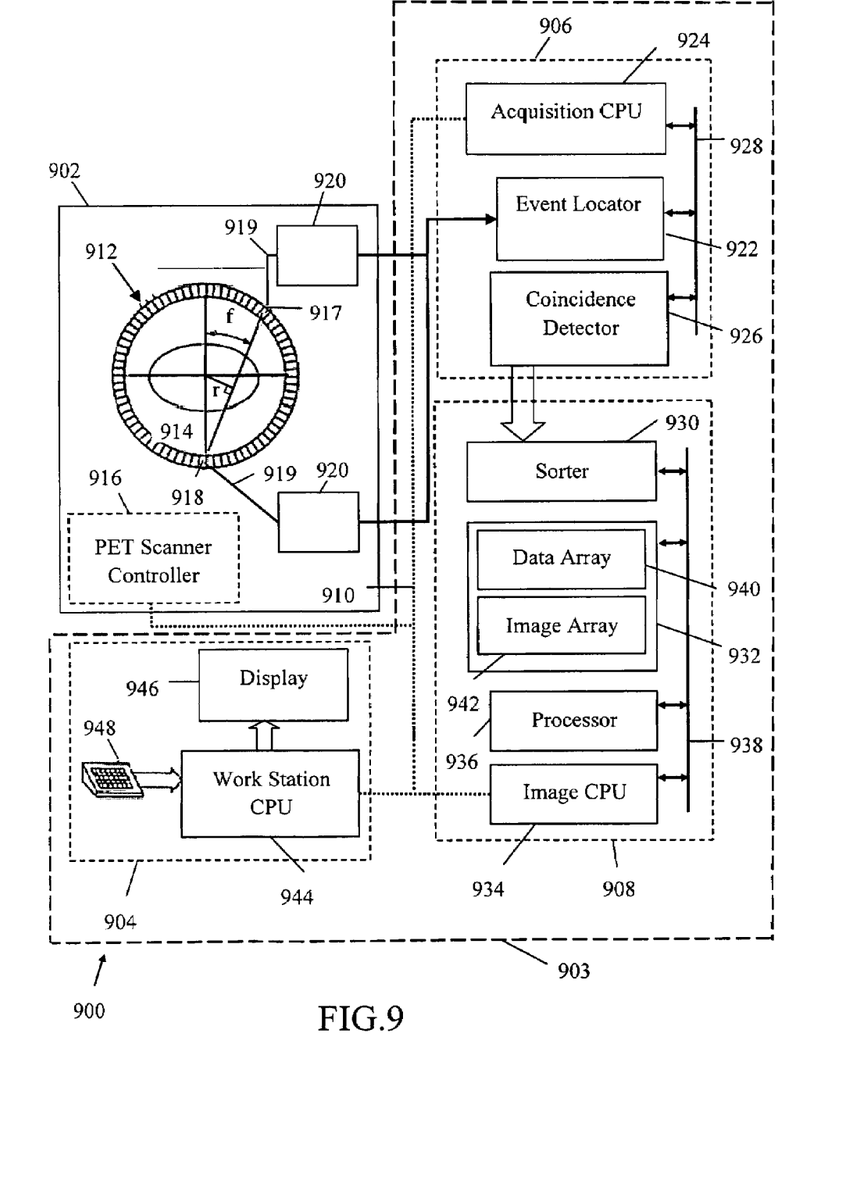
FIG. 9 is a block diagram of an exemplary embodiment of a PET system wherein various embodiments of the present invention may be implemented.

FIG. 9 is a block diagram of an exemplary embodiment of a PET system 900 in which various embodiments of the invention may be implemented. PET system 900 includes a PET scanner 902 and a controller 903 to control the normalization and image reconstruction processes. Controller 903 is also configured to correct losses in a normalization process due to dead-time in the detector blocks of PET scanner 902. The correction is performed using the various embodiments described herein. Controller 903 includes an operator workstation 904, a data acquisition processor 906 and an image reconstruction processor 908. PET scanner 902, operator workstation 904, data acquisition processor 906 and image reconstruction processor 908 are interconnected via a communication link 910 (e.g., a serial communication or wireless link). PET scanner 902, also referred to as a gantry, acquires scan data and transmits the data to data acquisition processor 906. The operation of PET scanner 902 is controlled from operator workstation 904. The data acquired by data acquisition processor 906 is reconstructed using a reconstruction processor 908.

PET scanner 902 may operate using, for example, a plurality of detector rings. One such detector ring, detector ring 912, is illustrated in FIG. 9. Detector ring 912 includes a central opening, in which a patient 914 may be positioned, using, for example, a motorized table, that is aligned with the central axis of detector ring 912. This motorized table moves patient 914 into the central opening of detector ring 912 in response to one or more commands received from operator workstation 904. A PET scanner controller 916, also referred to as the gantry controller, is provided (e.g., mounted) within PET scanner 902. PET scanner controller 916 responds to the commands received from operator workstation 904 through communication link 910. Therefore, the operation of PET scanner 902 is controlled from operator workstation 904 through PET scanner controller 916.

Detector ring 912 includes a plurality of detector units (e.g., in the GE Discovery™ ST PET system, there are 420 crystals per ring, and 24 rings in the scanner). For example, detector ring 912 includes a detector 917, a detector 918, and several other detectors. Detector 917, like the other detectors, includes a set of scintillator crystals arranged in a matrix that is disposed in front of a plurality of photomultiplier tubes (e.g., four tubes). When a photon collides with a crystal on a detector, it produces a scintilla on the crystal. Each photomultiplier tube produces an analog signal on communication line 919 when a scintillation event occurs. A set of acquisition circuits 920 is provided within PET scanner 902 to receive these analog signals. Acquisition circuits 920 produce digital signals indicating the 3-dimensional (3D) location and total energy of the event. Acquisition circuits 920 also produce an event detection pulse, which indicates the time or moment the scintillation event occurred. These digital signals are transmitted through a communication link, for example, a cable, to an event locator circuit 922 in data acquisition processor 906.

Data acquisition processor 906 includes event locator 922, an acquisition CPU 924 and a coincidence detector 926. Data acquisition processor 906 periodically samples the signals produced by acquisition circuits 920. Acquisition CPU 924 controls communications on a back-plane bus 928 and on communication link 910. Event locator circuit 922 processes the information regarding each valid event and provides a set of digital numbers or values indicative of the detected event. For example, this information indicates when the event took place and the position of the scintillation crystal that detected the event. An event data packet is communicated to coincidence detector 926 through back-plane bus 928. Coincidence detector 926 receives the event data packets from event locator circuit 922 and determines if any two of the detected events are in coincidence. Coincidence is determined by a number of factors. First, the time markers in each event data packet must be within a predetermined time period, for example, 12.5 nanoseconds, of each other. Second, the LOR formed by a straight line joining the two detectors that detect the coincidence event should pass through the field of view in PET scanner 902. Events that cannot be paired are discarded. Coincident event pairs are located and recorded as a coincidence data packet that is conveyed through a communication link to a sorter 930 in image reconstruction processor 908.

Image reconstruction processor 908 includes sorter 930, a memory module 932, an image CPU 934, an image processor 936 and a back-plane bus 938. Sorter 930 counts all events occurring along each projection ray and organizes them into 3D data. This 3D data (or sinograms) is organized in one exemplary embodiment as a data array 940. Data array 940 is stored in memory module 932. Back-plane bus 938 is linked to communication link 910 through Image CPU 934. Image CPU 934 controls communication through back-plane bus 938. Array processor 936 is also connected to back-plane bus 938. Array processor 936 receives data array 940 as an input and reconstructs images in the form of image arrays 942. Resulting image arrays 942 are stored in memory module 932.

The images stored in image array 942 are communicated by image CPU 934 to operator workstation 904. Operator workstation 904 includes a CPU 944, a display device 946 and an input device 948. CPU 944 connects to communication link 910 and receives inputs (e.g., user commands) from input device 948. Input device 948 may be, for example, a keyboard, mouse, or a touch-screen panel. Through input device 948 and associated control panel switches, the operator can control the calibration of PET scanner 902, the configuration of PET scanner 902, and the positioning of patient 914 for a scan. Similarly, the operator can control the display of the resulting image on display device 946 and perform image-enhancement functions using programs executed by workstation CPU 944.

While the invention has been described in terms of various specific embodiments, those skilled in the art will recognize that the invention can be practiced with modification within the spirit and scope of the claims.

What is claimed is:

1. A method for normalization of a positron emission tomography system, said method comprising:
   determining a plurality of block busy data during a normalization scan for a positron emission tomography system; and
   using the determined block busy data to provide dead-time correction during normalization of the positron emission tomography system.

2. A method in accordance with claim 1 wherein the determining comprises determining an instantaneous block busy value for each of a plurality of positions within the positron emission tomography system.

3. A method in accordance with claim 1 wherein said determining comprises determining a block busy value for each of a plurality of positions within the positron emission tomography system.

4. A method in accordance with claim 3 wherein the plurality of positions are defined by the distance from a source location to at least one block detector of the positron emission tomography system.

5. A method in accordance with claim 1 wherein the correction comprises a dead-time correction.

6. A method in accordance with claim 1 further comprising establishing a correction function for determining from an average block busy measurement, an actual block busy value at a position within the positron emission tomography system based upon the determined block busy measurement.

7. A method in accordance with claim 6 wherein the correction function is a transfer function.

8. A method in accordance with claim 6 wherein the positron emission tomography system includes a plurality of rings of detectors and further comprising establishing a correction function for more than one of the rings of detectors.

9. A method in accordance with claim 6 wherein the positron emission tomography system includes a plurality of rings of detectors and further comprising determining fitting parameters for establishing a correction function for more than one of the rings of detectors.

10. A method in accordance with claim 6 wherein said establishing is performed for each of a plurality of different positron emission tomography systems.

11. A method in accordance with claim 1 wherein said determining comprises measuring an actual block busy value.

12. A method in accordance with claim 1 wherein said determining comprises performing Monte Carlo modeling to determine a block busy value.

13. A method in accordance with claim 1 wherein said determining comprises performing empirical operations to determine a block busy value.

14. A method in accordance with claim 1 wherein the block busy data is a function of (i) a dead-time period and (ii) a count rate of signals received by a detector at a position within the positron emission tomography system.

15. A method in accordance with claim 14 wherein the dead-time period is a function of the time period for processing annihilation events detected by the positron emission tomography system.

16. A method in accordance with claim 1 wherein determining the block busy time periods comprises:
    obtaining values of average block busy values for each of a plurality of block detectors; and
    using the average block busy values to determine an instantaneous block busy value for any position of a rod source.

17. A method for correction of a rotating rod normalization of a positron emission tomography system, said method comprising:
    correcting for dead-time during a rotating rod normalization of a positron emission tomography system, said correcting being performed using a determined block busy value corresponding to each of a plurality of positions within the positron emission tomography system.

18. A method in accordance with claim 17 further comprising measuring an actual block busy value at each of the plurality of positions to obtain the determined block busy value.

19. A method in accordance with claim 17 further comprising performing Monte Carlo modeling to obtain the determined block busy value.

20. A method in accordance with claim 17 further comprising performing empirical calculations to obtain the determined block busy value.

21. A method in accordance with claim 17 wherein the positron emission tomography system includes a plurality of rings of detectors and wherein the determined block busy values are different for each of the plurality of positions of the plurality of rings of detectors.

22. A method in accordance with claim 17 wherein the determined block busy values for each of a plurality of positions are different for each of a plurality of different positron emission tomography systems.

23. A method for normalization of a positron emission tomography system, the method comprising:
    determining a measured average value of block busy at a given positron of a rotating rod source within a positron emission tomography system; and
    providing correction for losses due to dead-time in the positron emission tomography system, the correction being provided by using the value of block busy derived from measurements at different positrons of the rod source.

24. A method in accordance with claim 23 wherein determining the value of block busy comprises:
    obtaining values of average block busy for each block detector; and
    using the average block busy value to determine a model-based correction for dead-time based on the measured value of block busy for any position of the rod source.

25. A method in accordance with claim 24 wherein using the average block busy value comprises determining a model for converting the average block busy value to a pattern of dead-time correction for the normalization scan based solely upon the block busy and the LOR location.

26. A method in accordance with claim 25 wherein determining the model function comprises measuring actual values of block busy for different discrete positions and strengths of the normalization rod source.

27. A method in accordance with claim 25 wherein determining the model function comprises obtaining the transfer function by Monte Carlo simulation.

28. A method in accordance with claim 25 wherein determining the model function comprises obtaining the transfer function from first principles.

29. A method in accordance with claim 25 wherein the model function is determined separately for different major rings of detectors in the PET system.

30. A method in accordance with claim 24 wherein obtaining values of average block busy comprises:
   rotating the rod source in a circular orbit; and
   measuring values of average block busy at all the block detectors.

31. A method in accordance with claim 24 wherein providing the correction for losses comprises correcting losses in gamma ray counts due to dead-time in the positron emission tomography system.

32. A method for normalization of a positron emission tomography system, the normalization being performed by rotating a rod source within the positron emission tomography system, the positron emission tomography system comprising at least one ring of block detectors, said method comprising:
   obtaining values of average block busy for each block detector;
   using the average block busy value to determine a model of count losses for any position of the rod source; and
   providing correction for losses due to dead-time in the positron emission tomography system, the correction being provided by using measured values of block busy along with a parameterized model of the count losses.

33. A positron emission tomography system comprising:
   a positron emission tomography scanner; and
   a controller for controlling the operation of the positron emission tomography scanner, said controller configured to correct for a dead-time period during a rotating rod normalization of the positron emission tomography scanner, the dead-time correction based in part on a determined block busy fraction corresponding to each of a plurality of positions within the positron emission tomography scanner.

34. A positron emission tomography system in accordance with claim 33 wherein said positron emission tomography scanner comprises a plurality of rings of detectors, said controller configured to correct for a different dead-time period corresponding to each of the plurality of rings of detectors.

* * * * *